(12) United States Patent
Chen et al.

(10) Patent No.: US 12,047,953 B2
(45) Date of Patent: Jul. 23, 2024

(54) TWO-STAGE SIDELINK CONTROL INFORMATION FOR SIDELINK COMMUNICATIONS

(71) Applicant: MediaTek Singapore Pte. Ltd., Singapore (SG)

(72) Inventors: Tao Chen, Beijing (CN); Zhixun Tang, Beijing (CN); Chien-Yi Wang, Hsinchu (TW); Pei-Kai Liao, Hsinchu (TW); Min Lei, Beijing (CN)

(73) Assignee: MediaTek Singapore Pte. Ltd., Singapore (SG)

( * ) Notice: Subject to any disclaimer, the term of this patent is extended or adjusted under 35 U.S.C. 154(b) by 390 days.

(21) Appl. No.: 17/434,893

(22) PCT Filed: Apr. 2, 2020

(86) PCT No.: PCT/CN2020/082920
§ 371 (c)(1),
(2) Date: Aug. 30, 2021

(87) PCT Pub. No.: WO2020/200267
PCT Pub. Date: Oct. 8, 2020

(65) Prior Publication Data
US 2022/0061041 A1    Feb. 24, 2022

(30) Foreign Application Priority Data

Apr. 3, 2019   (CN) .......................... 201910296855.6
Apr. 4, 2019   (WO) ................ PCT/CN2019/081565

(51) Int. Cl.
*H04L 5/00*   (2006.01)
*H04W 72/20*   (2023.01)

(52) U.S. Cl.
CPC ........... *H04W 72/20* (2023.01); *H04L 5/0048* (2013.01)

(58) Field of Classification Search
CPC .... H04W 72/20; H04L 5/0048; H04L 5/0051; H04L 5/0053
See application file for complete search history.

(56) References Cited

U.S. PATENT DOCUMENTS 10,785,753 B1 *  9/2020  Li ......................... H04L 5/0044
2017/0099090 A1  4/2017  Liu et al.
(Continued)

FOREIGN PATENT DOCUMENTS

WO    WO 2018/052255 A1    3/2018

OTHER PUBLICATIONS

On sidelink physical layer structure, 3GPP TSG RAN WG1 #96, MediaTek Inc., R1-1901809, 2019, pp. 1-12 (Year: 2019).*
(Continued)

*Primary Examiner* — Lan-Huong Truong
(74) *Attorney, Agent, or Firm* — Helen Mao; Imperium Patent Works

(57) ABSTRACT

A method of two-stage sidelink control information (SCI) can include receiving a transport block, and transmitting from a transmission user equipment (Tx UE) to a reception user equipment (Rx UE) the transport block with two-stage SCI including a 1st-stage SCI and a 2nd-stage SCI. The 1st-stage SCI can be transmitted over a physical sidelink control channel (PSCCH). The 2nd-stage SCI and the transport block can share resources of a physical sidelink shared channel (PSSCH). The 2nd-stage SCI and the transport block can share a demodulation reference signal (DMRS).

19 Claims, 9 Drawing Sheets

(56) References Cited

U.S. PATENT DOCUMENTS

| | | |
|---|---|---|
| 2018/0076871 A1 | 3/2018 | Rahman et al. |
| 2019/0052335 A1 | 2/2019 | Rahman et al. |
| 2019/0173539 A1 | 6/2019 | Liu et al. |
| 2020/0260472 A1* | 8/2020 | Ganesan ............... H04W 72/20 |
| 2020/0304159 A1* | 9/2020 | Liao ..................... H04J 11/0036 |

OTHER PUBLICATIONS

Combined Chinese Office Action and Search Report issued Apr. 29, 2023, in corresponding Chinese Patent Application No. 202080003330.X (with English Translation of Category of Cited Documents), 9 pages.

International Search Report and Written Opinion issued on Jun. 29, 2020 in PCT/CN2020/082920 filed on Apr. 2, 2020.

"On sidelink physical layer structure," 3GPP TSG RAN WG1 #96, Media Tek Inc., R1-1901809, 2019, pp. 1-12.

"Discussion on Physical Layer Structure for NR V2X Sidelink," 3GPP TSG RAN WG1 #96, InterDigital Inc., R1-1902595, 2019, 9 total pages.

"Physical layer structures in NR V2X," 3GPP TSG RAN 3GPP TSG RAN WG1 #96, Lenovo, Motorola Mobility, R1-1902156, 2019, 4 total pages.

* cited by examiner

TWO-STAGE SIDELINK CONTROL INFORMATION FOR SIDELINK COMMUNICATIONS

CROSS REFERENCE TO RELATED APPLICATIONS

This present application claims the benefit of International Application No. PCT/CN2019/081565, "2-Stage SCI for V2X Communication" filed on Apr. 4, 2019 which claims the benefit of Chinese Application No. 201910296855.6, "2-Stage SCI for V2X communication" filed on Apr. 3, 2019. The disclosures of the prior applications are hereby incorporated by reference in their entirety.

TECHNICAL FIELD

The present disclosure relates to wireless communications, and specifically relates to sidelink communications.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Cellular based vehicle-to-everything (V2X) (e.g., LTE V2X or NR V2X) is a radio access technology developed by the 3rd Generation Partnership Project (3GPP) to support advanced vehicular applications. In V2X, a direct radio link (referred to as a sidelink) can be established between two vehicles. The sidelink can operate under the control of a cellular system (e.g., radio resource allocation) when the vehicles are within the coverage of the cellular system. Or, the sidelink can operate independently when no cellular system is present.

SUMMARY

Aspects of the disclosure provide a method of two-stage sidelink control information (SCI). The method can include receiving a transport block, and transmitting from a transmission user equipment (Tx UE) to a reception user equipment (Rx UE) the transport block with two-stage SCI including a 1st-stage SCI and a 2nd-stage SCI. The 1st-stage SCI can be transmitted over a physical sidelink control channel (PSCCH). The 2nd-stage SCI and the transport block can share resources of a physical sidelink shared channel (PSSCH). The 2nd-stage SCI and the transport block can share a demodulation reference signal (DMRS).

In an example, the 2nd-stage SCI and the transport block are transmitted using a same transmission scheme with same one or more antenna ports. In an example, polar coding is applied to the 2nd-stage SCI. In an example, the 1st-stage SCI includes fields for determining a time-frequency location of the 2nd-stage SCI. In an embodiment, the method can further include performing resource element (RE) mapping of the 2nd-stage SCI over resources of the PSSCH first in frequency domain and then in time domain.

In an embodiment, the 1st-stage SCI indicates a modulation and coding scheme (MCS) for transmission of the transport block. In an embodiment, a resource size of the 2nd-stage SCI can be determined based on the indicated MCS for transmission of the transport block. In an example, the 1st-stage SCI and the 2nd-stage SCI are multiplexed in different symbols in time domain or in different physical resource blocks in frequency domain. In an example, the 1st-stage SCI includes information of antenna port(s) used for transmission of the PSSCH. In an example, the 1st-stage SCI includes a field indicating whether a DMRS for the 1st-stage SCI is quasi-co-located (QCLed) with the 2nd-stage SCI and the transport block transmitted over the PSSCH. Or UE may assume QCLed transmission between 1st-stage SCI and 2nd-stage SCI, e.g., QCL'ed transmission between the DMRS of 1st-stage SCI and the DMRS of 2nd-stage SCI so that the joint channel estimation can be applied.

Aspects of the disclosure provide an apparatus including circuitry. The circuitry can be configured to receive a transport block, and transmit from a Tx UE to a Rx UE the transport block with two-stage SCI including a 1st-stage SCI and a 2nd-stage SCI. The 1st-stage SCI is transmitted over a PSCCH. The 2nd-stage SCI and the transport block share resources of a PSSCH. The 2nd-stage SCI and the transport block share a DMRS.

Aspects of the disclosure provide a non-transitory computer-readable medium storing instructions implementing the method of two-stage SCI.

BRIEF DESCRIPTION OF DRAWINGS

Various embodiments of this disclosure that are proposed as examples will be described in detail with reference to the following figures, wherein like numerals reference like elements, and wherein.

DETAILED DESCRIPTION

Figure 1:
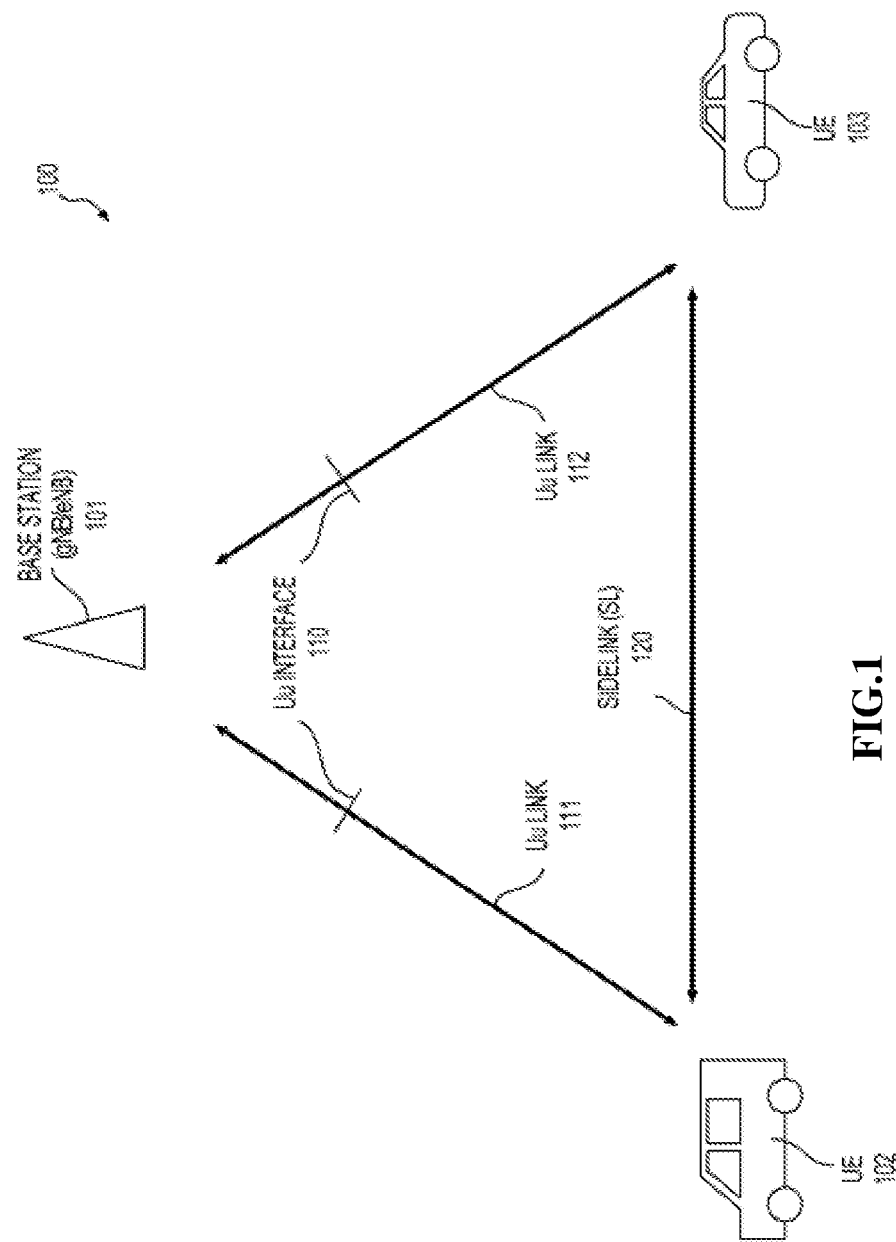
FIG. 1 shows a wireless communication system 100 according to an embodiment of the disclosure.

FIG. 1 shows a wireless communication system 100 according to an embodiment of the disclosure. The system 100 can include a base station (BS) 101, a first user equipment (UE) 102, and a second UE 103. The BS 101 can be an implementation of a gNB specified in the 3rd Generation Partnership Project (3GPP) New Radio (NR) standards, or can be an implementation of an eNB specified in 3GPP Long Term Evolution (LTE) standards. Accordingly, the BS 101 can communicate with the UE 102 or 103 via a radio air interface 110 (referred to as a Uu interface 110) according to respective wireless communication protocols. In other examples, the BS 101 may implement other types of standardized or non-standardized radio access technologies, and communicate with the UE 102 or 103 according to the respective radio access technologies. The UE 102 or 103 can be a vehicle, a computer, a mobile phone, a roadside unit, and the like.

The UEs 102 and 103 can communicate with each other based on vehicle-to-everything (V2X) technologies, for example, as specified in 3GPP standards. A direct radio link 120, referred to as a sidelink (SL), can be established between the UEs 102 and 103. The UE 102 can use a same spectrum for both uplink transmissions over a Uu link 111 and sidelink transmissions over the sidelink 120. Similarly, the UE 103 can use a same spectrum for both uplink transmissions over a Uu link 112 and SL transmissions over the sidelink 120. In addition, allocation of radio resources over the sidelink 120 can be controlled by the BS 101.

Different from the FIG. 1 example (in-coverage scenario) where the UEs 102 and 103 performing sidelink communications are under network coverage (the coverage of a cell of the BS 101), in other examples, UEs performing sidelink communications can be outside of network coverage. For example, a sidelink can be established between two UEs both of which are located outside of network coverage (out-of-coverage scenario), or one of which is located outside of network coverage (partial-coverage scenario).

In some examples, a group of UEs (such as the UEs 102 and 103) in a local area may communicate with each other using sidelinks under or without control of a base station. Each UE in the group may periodically or aperiodically transmits messages to neighboring UEs. In addition, the respective transmissions can be of a type of unicast, groupgast, or broadcast. For example, hybrid automatic repeat request (HARQ) and link adaptation mechanisms can be employed at a Tx UE to support unicast or groupcast between the Tx UE and a target UE(s).

Figure 2:
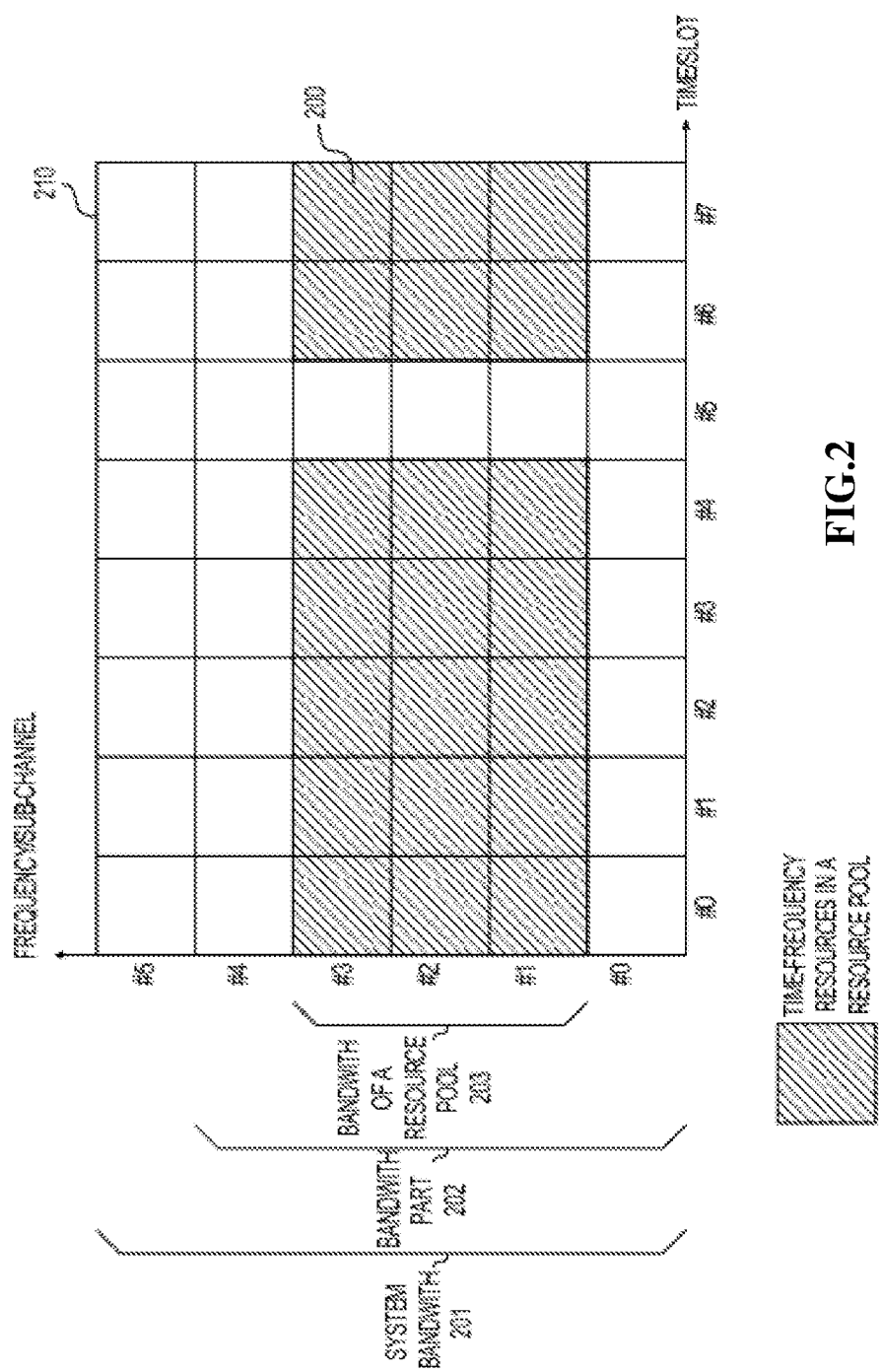
FIG. 2 shows an example of a resource pool 200 configured for sidelink communications according to an embodiment of the disclosure.

FIG. 2 shows an example of a resource pool 200 configured for sidelink communications according to an embodiment of the disclosure. For example, the resource pool 200 can be configured to the UE 102 from the BS 101, or can be pre-configured to the UE 102 (e.g., a resource pool configuration is stored in a universal integrated circuit card (UICC) of the UE 102). The resource pool 200 can be defined over a time-frequency (slot/sub-channel) resource grid 210. Radio resources for transmission of physical channels (e.g., physical sidelink control channel (PSCCH), physical sidelink shared channel (PSSCH), and the like) from the UE 102 on the sidelink 120 can be allocated based on the resource pool 200.

As shown, a system bandwidth 201 of the UE 102 can include sub-channels #0-#6. Each sub-channel may include a number of physical resource blocks (PRBs, or RBs) (e.g., 5, 10, or 20 PRBs). The resource pool 200 can include a set of consecutive (or non-consecutive) sub-channels #1-#3 in frequency domain. If the UE 102 operates in a bandwidth part (BWP) [203]202, the sub-channels of the resource pool 200 can be configured to be in the BWP 203. In time domain, the resource pool 200 can include a number of slots (e.g., slots #0-#4 and #6-#7) that can be consecutive or non-consecutive in different examples.

Resource pools can be (pre-)configured to the UE 102 separately from the transmission perspective (Tx pools) and the reception perspective (Rx pools). Accordingly, the UE 102 can monitor for PSCCHs, and hence receive respective PSSCH transmissions from other UEs in a Rx pool while performing transmissions in a Tx pool, such as the resource pool 200.

In an embodiment, two resource allocation modes (Mode 1 and Mode 2) can be used for allocating radio resources for PSCCH and PSSCH transmissions over a sidelink. In Mode 1, the BS 101 performs the function of resource scheduling. For example, the BS 101 can provide dynamic grants of sidelink resources, or semi-statically configured grants of periodic sidelink resources (referred to as sidelink configured grants) to the UE 102 for sidelink communications over the sidelink 120.

A dynamic sidelink grant can be provided in a downlink control information (DCI), and schedule resources for an initial transmission of a transport block, and optionally, retransmissions of the same transport block. The retransmissions can be blindly repeated transmissions, or can be retransmissions in response to a HARQ feedback. In one example, resources for each transmission or retransmission can be spanned over one or more sub-channels but limited within one slot in the sidelink resource pool 200.

For a sidelink configured grant, the scheduled resources can be a set of sidelink resources recurring with a periodicity. Activation or deactivation signaling via DCI can be employed to start or terminate usage of the sideling configured grant.

When the UE 102 is in an out-of-coverage status, or the UE 102 is in an in-coverage status but instructed by the BS 101, Mode 2 can be employed for resource scheduling (resource allocation). In Mode 2, the UE 102 can autonomously select resources for sidelink transmissions based on a sensing procedure. For example, the UE 102 can sense, within a (pre-)configured resource pool, which resources are not in use by other UEs with higher-priority traffic, and select an appropriate amount of resources for sidelink initial transmissions and, optionally, retransmissions. In the selected such resources, the UE can transmit and re-transmit a certain number of times.

For example, the UE 102 can reserve resources to be used for a number of blind (re-)transmissions or HARQ-feedback-based (re-)transmissions of a transport block. The UE 102 can also reserve resources to be used for an initial transmission of a later transport block. The reserved resources can be indicated in an SCI scheduling a transmission of a transport block. Alternatively, an initial transmission of a transport block can be performed after sensing and resource selection, but without a reservation.

SCIs (e.g., 1st-stage SCI) transmitted by UEs on PSCCH indicate selected time-frequency resources in which the respective UE will transmit a PSSCH. (The indicated time-frequency resources can be allocated with either Mode 1 or Mode 2.) These SCI transmissions can be used by the sensing UE 102 to maintain a record of which resources have been reserved by other UEs in the recent past. When a resource selection is triggered (e.g. by traffic arrival or a resource re-selection trigger), the UE 102 considers a sensing window which starts a (pre-)configured time in the past and finishes shortly before the trigger time. The sensing UE 102 also measures, for example, the PSSCH-RSRP over selected or reserved resources in the slots of the sensing window. The measurements can indicates a level of interference which would be experienced if the sensing UE 102 were to transmit in the selected or reserved resources.

The sensing UE 102 can then select resources for transmission(s) or retransmission(s) from within a resource selection window. For example, the resource selection window starts after the trigger for transmission, and cannot be longer than a remaining latency budget of a to-be-transmitted transport block. Based on the SCIs from the other UEs and the measurements as described above, selected or reserved resources by the other UEs in the selection window with PSSCH-RSRP above a threshold are excluded from being candidates by the sensing UE 102. The threshold can be set according to priorities of the traffic (e.g., priorities associated with respective transport blocks) of the sensing UEs and the other transmitting UEs. Thus, a higher priority transmission from the sensing UE 102 can occupy resources which are reserved by a transmitting UE with sufficiently low PSSCH-RSRP and sufficiently lower-priority traffic.

From the set of resources in the selection window which have not been excluded, the sensing UE can identify a certain percentage (e.g., 20%) of the available resources within the window as candidate resources. The UE 102 may select from the candidate resources for a number of initial- or re-transmissions of the to-be-transmitted transport block, for example, in a random way.

Figure 3:
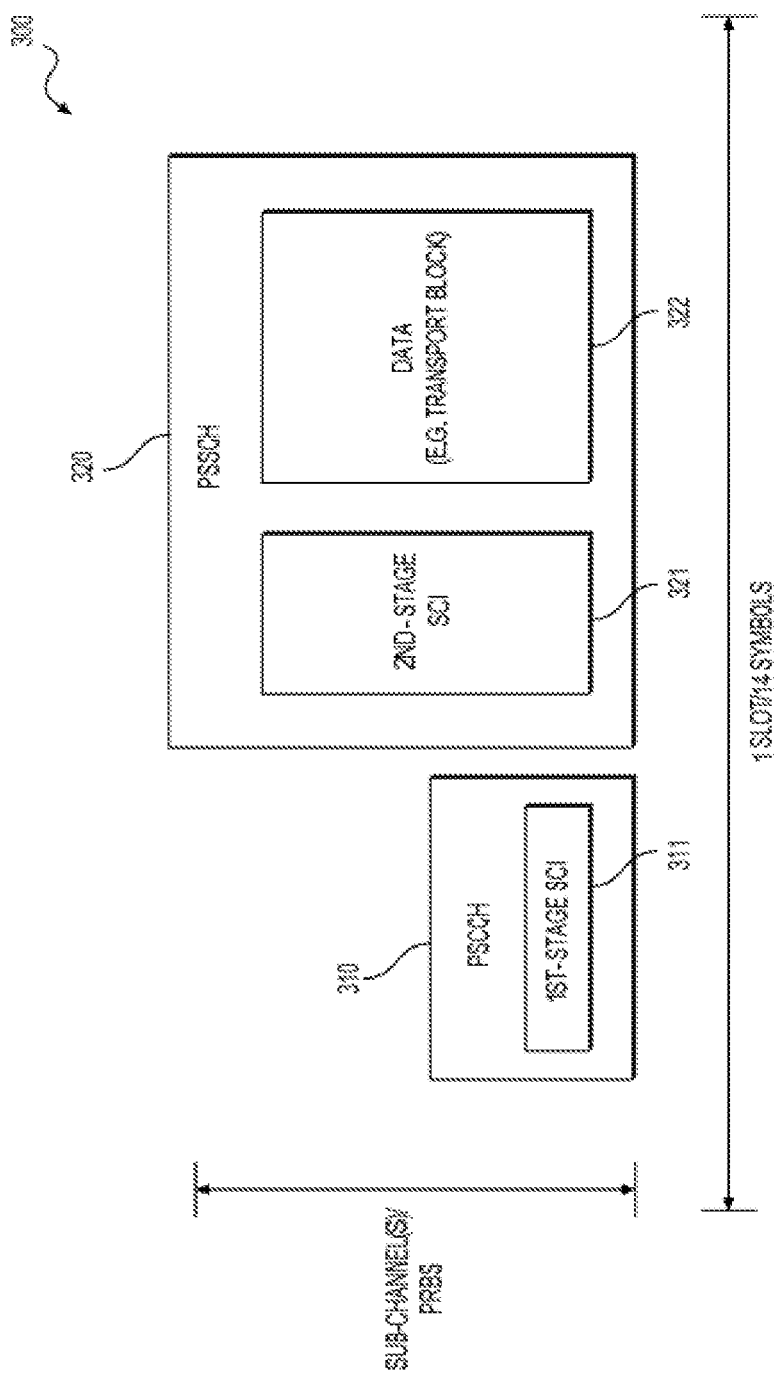
FIG. 3 shows an example of a sidelink transmission 300 with a two-stage sidelink control information (SCI) according to an embodiment of the disclosure.

FIG. 3 shows an example of a sidelink transmission 300 with a two-stage SCI according to an embodiment of the disclosure. In the sidelink transmission 300, a PSCCH 310 and a PSSCH 320 associated with the PSCCH 310 can be generated and transmitted from the UE 102. The PSCCH 310 can carry a 1st-stage SCI 311, while the PSSCH 320 can carry a 2nd-stage SCI 321 and data 322 (e.g., data of a transport block). For example, the 1st-stage or 2nd-stage SCI can be generated and processed (e.g., channel coding, modulation, precoding, and the like) at a physical layer before being mapped to resource elements (REs) in the respective physical channels (e.g., PSCCH 310 or PSSCH 320). The transport block can be received from a higher layer (e.g., medium access control (MAC) layer) and processed (e.g., channel coding, modulation, precoding, and the like) at the physical layer before being mapped to REs in the respective PSSCH 320.

In one example, the UE 102 can be configured to perform each transmission or retransmission of a transport block or other type of data within a slot in time domain. Accordingly, as shown in FIG. 3, resources for transmitting PSCCH 310 and PSSCH 320 can be selected in a Tx resource pool within a slot in time domain and one or more sub-channels in frequency domain. In an example, a slot may include 14 symbols (e.g., orthogonal frequency division multiplexing (OFDM) symbols) but may have different duration depending on respective sub-carrier spacings. For example, corresponding to different sub-carrier spacings 15 kHz, 30 kHz, or 60 kHz, a 1-ms subframe may include 1, 2, or 4 slots each including 14 symbols.

In other examples, the PSCCH 310 and the PSSCH 320 may be transmitted in different slots. Accordingly, resources for transmitting PSCCH 310 and PSSCH 320 can be selected from different slots in a Tx resource pool.

In FIG. 3, the PSCCH 310 and the PSSCH 320 are shown to be time-division multiplexed (TDMed). However, in other examples, the PSCCH 310 and the PSSCH 320 can be frequency-division multiplexed (FDMed). For example, within the bandwidth of the assigned sub-channels in FIG. 3, the resources above the PSCCH 310 can also be assigned for transmission of the PSSCH 320.

Figure 4:
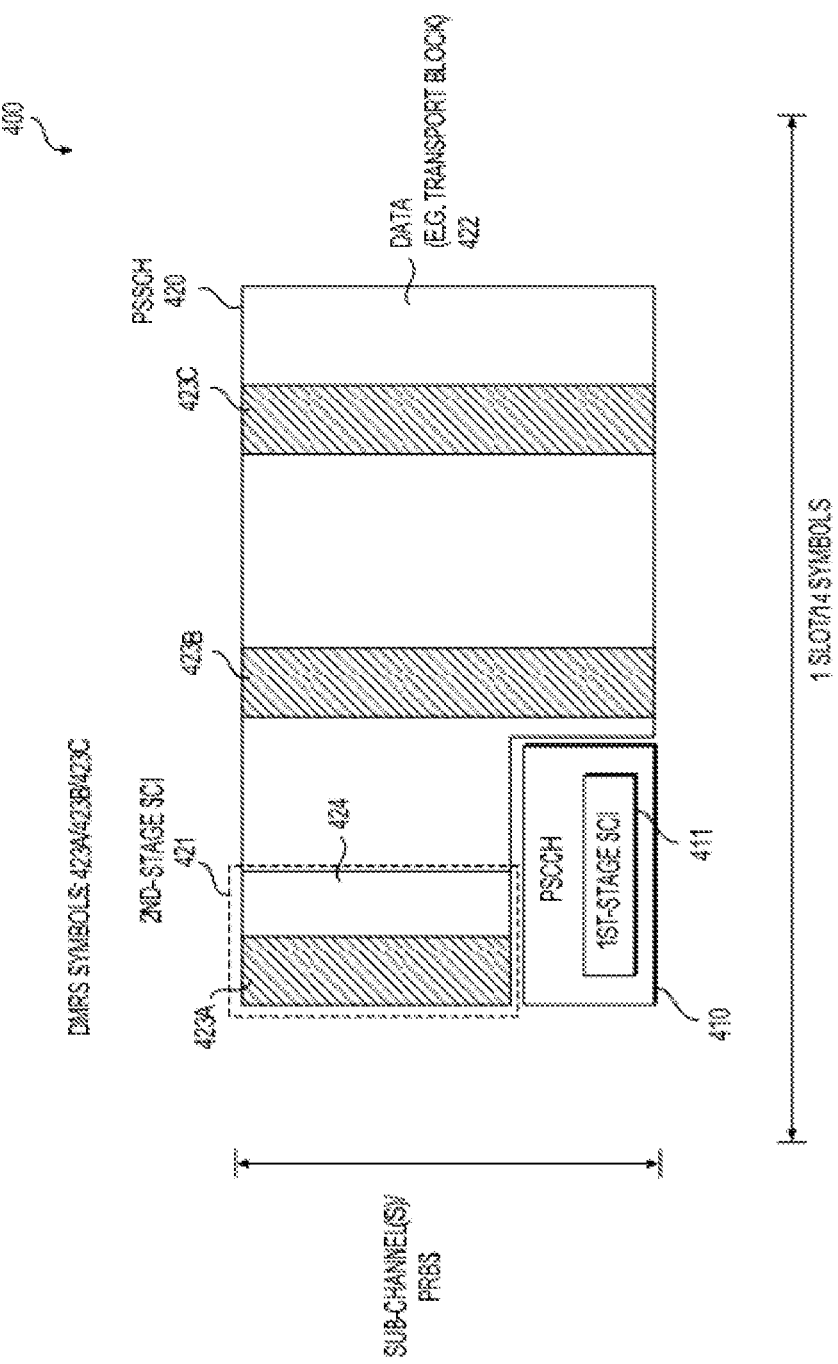
FIG. 4 shows another example of a sidelink transmission 400 with a two-stage SCI according to an embodiment of the disclosure.

FIG. 4 shows another example of a sidelink transmission 400 with a two-stage SCI according to an embodiment of the disclosure. In the sidelink transmission 400, a PSCCH 410 and an associated PSSCH 420 can be generated and transmitted from the UE 102. The PSCCH 410 can carry a 1st-stage SCI 411, while the PSSCH 420 can carry a 2nd-stage SCI 421 and data 422 (e.g., data of a transport block). Similar to the FIG. 3 example, time-frequency resources for transmitting PSCCH 410 and the PSSCH 420 can be selected to be within a slot in time domain and one or more sub-channels in frequency domain in a Tx resource pool. Different from the FIG. 3 example, the PSSCH 420 is TDMed and FDMed with the PSCCH 410.

In addition, as shown in FIG. 4, the PSSCH 420 can be multiplexed with a demodulation reference signal (DMRS) mapped in several symbols 423A, 423B, and 423C (referred to as DMRS symbols). In an example, PRBs in the DMRS symbols can each include REs in which the DMRS is mapped. The REs carrying the DMRS in one DMRS symbol may form a comb-alike structure in some examples. REs without carrying the DMRS in one DMRS symbol can be used to carry the 2nd-stage SCI 421 or the data 422.

Two-stage SCI is used for sidelink transmission in the examples of FIG. 3 and FIG. 4. The corresponding sidelink transmissions 300 or 400 can be of a type of unicast, groupcast, or broadcast. During the transmissions 300/400, the 1st-stage SCI 311/411 can be employed for sensing purpose and targets all UEs neighboring the Tx UE 102 (all UEs refers to UEs that can be reached by the 1st-stage SCI 311/411). Thus, the 1st-stage SCI 311/411 can carry information related to channel sensing, and is transmitted in a broadcast manner (e.g., with a low coding rate) such that the 1st-stage SCI 311/411 can be decodable by all the neighboring UEs.

In contrast, the 2nd-stage SCI 321/421 can target UEs involved in unicast or groupcast communications (the target UEs are a subset of all UEs). Thus, the 2nd-stage SCI 321/421 can carry information (e.g., new data indicator, and redundancy version (RV)) needed for decoding the data 322/422, and may be transmitted with link adaptation based on channel conditions between the Tx UE 102 and the target UEs. For example, a high coding rate may be used for transmitting the 2nd-stage SCI 321/421 to improve spectra efficiency. The high coding rate can be determined based on a signal to noise ratio (SNR) level of channels between the Tx UE 102 and the target UEs. In an example, polar code is used for channel coding of the 2nd-stage SCI 321/421.

In an embodiment, the 1st-stage SCI 311/411 can have a fixed size (fixed number of bits) for unicast, groupcast, or broadcast. In addition, the 1st-stage SCI 311/411 can have a fixed aggregation level. In other words, the 1st-stage SCI 311 can have a fixed number of resource elements (REs) for transmission. Further, a time/frequency location(s) of the resources assigned for the 1st-stage SCI 311 can be preconfigured to be fixed. With the fixed size, number of REs, and time/frequency location(s), a sensing UE or a receiving UE can decode the 1st-stage SCI 311 without blind detection for the decoding. Decoding complexity of the PSCCH 310/410 can thus be reduced.

In an embodiment, the 2nd-stage SCI 321/421 can similarly have a fixed size. During unicast or groupcast communications, link adaptation can be adopted for transmission of the 2nd-stage SCI 321/421 resulting in different aggregation levels (or different number of REs). To avoid or reduce complexity of blind detection of the 2nd-stage SCI 321/421 at a receiving UE, the 1st-stage SCI 311/411 can indicate (explicitly or implicitly) the resource size (or the number of REs) of the 2nd-stage SCI 321/421, and/or time/frequency location of the 2nd-stage SCI 321/421. The two-stage SCI transmission can thus take advantage of link adaptation for transmission of the 2nd-stage SCI 321/421 to improve spectrum efficiency without increasing decoding complexity. In contrast, a single stage transmission of SCI with link adaptation would incur blind decoding, thus increasing decoding complexity.

In some embodiments, multi-antenna transmission is employed. The PSSCH 320/420 in the FIG. 3 or FIG. 4 example can be transmitted with one of various transmission schemes, for example, corresponding to various transmission modes specified in 3GPP Long Term Evolution (LTE) or New Radio (NR) standards. Examples of the transmission schemes can include precoder-based multi-antenna transmission, multi-user multi-input and multi-output (MIMO), transmit diversity, or the like. Corresponding to one transmission scheme, one or more antenna ports may be used for transmission of the PSSCH 320/420 (e.g., in multiple layers). Accordingly, the 2nd-stage SCI 321/421 and the corresponding data 322/422 can be transmitted with the same transmission scheme and the same antenna port(s). For transmission on each antenna port, the 2nd-stage SCI and the corresponding data of a same layer can share a same DMRS, and there is no need to configure a dedicated DMRS for the 2nd-stage SCI 321/421. In this way, overhead (resource occupation) of reference signals can be reduced.

For example, when multi-antenna transmission is employed, the 1st-stage SCI 311/411 can carry antenna port information and/or DMRS pattern information of the respective PSSCH 320/420. For example, a number of antenna ports (an amount of the used antenna ports) can be indicated in the 1st-stage SCI 311/411. And/or, one or more indices of the used antenna ports can be indicated in the 1st-stage SCI 311/411. In addition, a DMRS pattern (e.g., defining the number and location of DMRS symbols) can be indicated in the 1st-stage SCI 311/411. Depending on a relative speed between the Tx UE 102 and a receiving UE, different DMRS pattern can be used. Based on the antenna port information and the DMRS pattern information carried in the 1st-stage SCI 311/411, a receiving UE can determine the respective DMRS and perform channel estimation, and accordingly decode the 2nd-stage SCI 321/421 as well as the data 322/422 transmitted in the same antenna port(s) as the respective DMRS.

In an embodiment, the PSCCH 310/410 can also have DMRS multiplexed over one or more symbols (referred to as PSCCH DMRS with respect to the above PSSCH DMRS of the PSSCH 320/420). The 1st-stage SCI 311/411 can include a field indicating whether the PSCCH DMRS is quasi-co-located (QCLed) with the PSSCH DMRS (or QCLed with the 2nd-SCI 321/421 and/or the data 322/422) (e.g., Type-A and/or Type-D QCl'ed relation as defined in 3GPP TS38.213). When the PSCCH DMRS and the PSSCH DMRS are indicated to be QCLed, a receiving UE can accordingly combine the PSCCH DMRS with the PSSCH DMRS for channel estimation to improve performance. Results of the channel estimation can be used for coherently demodulating the PSSCH 320/420. Or UE may assume QCLed transmission between 1st-stage SCI and 2nd-stage SCI, e.g., QCL'ed transmission between the DMRS of 1st-stage SCI and the DMRS of 2nd-stage SCI.

In an embodiment, the 1st-stage SCI 311/411 can include one or more fields indicating a time-frequency location of the respective 2nd-stage SCI 321/421. For example, the 1st-stage SCI 311/411 can include a field (e.g., including code point) indicating a number of (one or more) sub-channels assigned for transmission of the PSSCH 320/420. Additionally, the PSCCH 310/410 can be configured to be at the bottom of the assigned sub-channels. Accordingly, a receiving UE can first detect a position of the PSCCH 310/410 in frequency domain (according to the configuration), and subsequently determine the frequency location of the PSSCH 320/420 using information of the assigned sub-channels carried in the 1st-stage SCI.

In an example, the time domain location of the respective 2nd-stage SCI 321/421 can be determined based on DMRS pattern information carried in the 1st-stage SCI 311/411. For example, as shown in FIG. 4, RE mapping of the 2nd-stage SCI 421 can be configured to start from the first DMRS symbol 423A of the PSSCH 420 in time domain, and continue to next symbols (e.g., symbol 424) neighboring the first DMRS symbol 423A. Accordingly, based on such a configuration, according to the DMRS pattern information carried in the 1st-stage SCI 311/411, a receiving UE can determine the time location of the respective 2nd-stage SCI 321/421. In some other examples, RE mapping of the 2nd-stage SCI 321/421 can be configured to start from the first symbol of the resources of the PSSCH 320/420 in time domain.

While the first DMRS symbol 423A is shown to be the first symbol of the PSSCH 420 in the FIG. 4 example, in other examples, a first DMRS symbol corresponding to a DMRS pattern can be located at symbols other than the first symbol of a PSSCH. For example, the DMRS symbol 423A is not transmitted in one example with a different DMRS pattern. The DMRS symbol 423B becomes the first DMRS symbol. Accordingly, RE mapping of the 2nd-stage SCI 421 can start from the DMRS symbol 423B.

In an embodiment, RE mapping of the 2nd-stage SCI 321/421 is performed in a frequency domain first and time domain second manner. For example, from a starting symbol (e.g., the first DMRS symbol 423A in FIG. 4), the 2nd-stage SCI 321/421 is mapped to available REs (excluding REs occupied by the DMRS) of the starting symbol, and them mapped to the next symbols. In an example, the mapping can be performed by mapping to all PRBs in all sub-channels of the PSSCH 320/420 in the starting symbol first and subsequently moving on to the next symbol.

In an example, the UE 102 can perform a link adaptation for transmitting the data 322/422 based on a radio link quality of a target channel. The radio link quality can be indicated by a channel quality indicator (CQI) provided from a Rx UE. According to the radio link quality, and with a target error probability (e.g., a block error rate (BLER) less than 10%), the UE 102 can determine a MCS (or a MCS index) for transmitting the data 322/422 to the Rx UE over the target channel. The MCS index can correspond to a modulation level and a coding rate for transmission of the data 322/422.

The UE 102 can also perform a second link adaptation for the 2nd-stage SCI 321/421. As the 2nd-stage SCI 321/421 and the data 322/422 are to be transmitted over the same target channel, the link adaptation of the 2nd-stage SCI 321/421 can target a same SNR level of the target channel as the link adaptation of the data 322/422. However, transmission of the 2nd-stage SCI 321/421 can have a different target error probability (e.g., a BLER less than 1%). Accordingly, a different coding rate can be determined for transmission of the 2nd-stage SCI 321/421.

In addition, as described, the size (number of bits) of the 2nd-stage SCI 321/421 can be fixed. Accordingly, when the coding rate of the 2nd-stage SCI 321/421 is determined, a number of to be transmitted bits (bits carried in REs) can be determined. In an embodiment, a modulation level of the 2nd-stage SCI 321/421 can be preconfigured to be quadrature phase shift keying (QPSK), and accordingly an RE can carry a modulation symbol corresponding to 2 bits. A number of REs for transmitting the 2nd-stage SCI 321/421 can thus be determined by dividing the number of to-betransmitted bits with the number of bits (2 bits for QPSK) carried in one RE. As a result of the link adaptation, a resource size (the number of REs) for transmitting the 2nd-stage SCI 321/421 can be determined at the UE 102.

As described above, transmissions of a 2nd-stage SCI and corresponding data in a same PSSCH target a same SNR level. Thus, the link adaptations of 2nd-stage SCI and corresponding data are associated with each other. For example, corresponding to a MCS for transmitting the data, the SNR level can be determined; and corresponding to the SNR level, a resource size (or coding rate) for transmitting the 2nd-stage SCI can be determined. Accordingly, in an embodiment, a mapping relationship between the resource size for transmitting the 2nd-stage SCI and the MCS for transmitting the respective data can be defined for different link adaptation scenarios (e.g., different radio link qualities). When transmitting a PSSCH at the UE 102, a MCS for transmitting data can first be determined, and subsequently, a resource size for transmitting a respective 2nd-stage SCI can accordingly be determined based on the predefine mapping relationship. In an example, the mapping relationship can be specified in a form of a mapping table.

Similarly, the above defined mapping relationship can be used at a receiving UE. For example, the 1st-stage SCI 311/411 can include a field indicating a MCS for transmitting the data 322/422. At the receiving UE, based on the mapping relationship as define above, the reception UE can determine the resource size of the 2nd-stage SCI 321/421 based on the MCS indicated in the 1st-stage SCI 311/411. Additionally, the 1st-stage SCI 311/411 may further include fields indicating a time-frequency starting location of the 2nd-stage SCI (e.g., the bandwidth of the PSSCH 320/420 and the DMRS pattern). According to the RE mapping rule (frequency domain first and time domain second), the resource size, the starting location, the Rx UE can effectively determine REs carrying the 2nd-stage SCI 321/421 in a radio resource grid. Blind detection of the 2nd-stage SCI 321/421 can thus be avoided.

Other embodiments related with two-stage SCI are described below.

In an embodiment, for V2X sidelink communication, a PSSCH can be scheduled by SCI carried in a PSCCH. In an embodiment, 2-stage SCI can be used by applying a 1st-stage SCI (or referred to as a 1st SCI) for the purpose of sensing and broadcast communication whereas a 2nd-stage SCI (or referred to as 2nd SCI) carrying the remaining information for data scheduling of unicast/groupcast data transmission.

In an embodiment, a 2nd-stage SCI time/frequency location can be derived from the information fields carried in a 1st-stage SCI. In an embodiment, both 1st-and 2nd-stage SCIs can be transmitted using centralized frequency resources or distributed frequency resources. In an embodiment, 1st-stage SCI and 2nd-stage SCI can be time domain multiplexed in different symbols and/or frequency domain multiplexed in different PRBs (interleaved or non-interleaved). In some embodiments, a 2nd-stage SCI can share/use the time/frequency resources reserved for the data channel (e.g., PSSCH).

A 2nd-stage SCI can have link adaptation associated with a data channel link adaptation. 2nd-stage SCI can have the same transmission scheme as the data channel with the same antenna port(s) or the different transmission scheme with different antenna port(s) but with the same power per resource element.

In an embodiment, power boosting can be applied between sidelink control channel and data channel. The power offset can be indicated during sidelink radio resource control (RRC) connection setup for unicast/groupcast communication or indicated in the 1st-stage SCI.

In an example, a DMRS location in frequency domain for the 1st-stage SCI can be fixed. The reference signal for 1st- and/or 2nd-stage SCI can reuse/share the data channel (PSSCH) DMRS wholly or partly with no need of a dedicated DMRS for 2nd-stage SCI to reduce the overhead. The dest (or source) UE/group ID can be used for sequence generation of the data channel DMRS (also shared by 2nd-stage SCI). Alternatively, the reference signal for 1st- and/or 2nd-stage SCI can have their own dedicated DMRS than data channel DMRS. It is possible to perform the channel estimation for 1st- and/or 2nd-stage SCI based on the dedicated DMRS independently or jointly with data DMRS if the antenna port and/or transmission scheme is the same for data and control channel.

Channel coding of the 2nd-stage SCI can use polar code. A shorter cyclic redundancy check (CRC) (e.g, 16 bits CRC) can be applied for the 2nd-stage SCI (and/or 1st-stage SCI) to reduce the CRC overhead.

In some examples, it can be indicated in the 1st-stage SCI whether a DMRS of 1st-stage SCI and a DMRS of 2nd-stage SCI/Data are QCLed or whether the same transmission scheme is used based on the same antenna port(s). Then channel estimation for 2nd-stage SCI/Data can use 1st-stage SCI DMRS or not depending on the indication at a receiving UE. Or UE may assume QCLed transmission between 1st-stage SCI and 2nd-stage SCI, e.g., QCL'ed transmission between the DMRS of 1st-stage SCI and the DMRS of 2nd-stage SCI so that the joint channel estimation can be applied.

As an example, Table 1 shows a comparison between fields of 2-stage SCI (including a 1st-stage SCI and a 2nd-stage SCI) and a single SCI according to some embodiments.

TABLE 1

| | 2-stage SCI | | | |
| --- | --- | --- | --- | --- |
| | 1 st-stage SCI | | 2nd-stage SCI for | |
| Parameters | Broadcast | Unicast/ groupcast | unicast/group cast | Single SCI |
| Format indicator | 1~2 | 1~2 | 0 | 0 |
| SRC ID (16 bits) | 0 | 0 | 0 | 16 |
| Dest ID (16 bits) | 0 | 16 | 0 | 16 |
| Other SCI payload | 36 | 20 | 22 | 47 |
| Priority | 3 | 3 | 0 | 3 |
| Resource reservation | 4 | 4 | 0 | 4 |
| Frequency resource location | 8 | 8 | 0 | 8 |
| Time gap between initial transmission and retransmission | 4 | 0 | 0 | 4 |
| Retransmission index | 1 | 1 | 0 | 1 |
| Modulation and coding scheme | 5 | 0 | 4 | 5 |
| Transmission format | 1 | 0 | 1 | 1 |
| New data indicator | 1 | 0 | 1 | 1 |
| Redundancy version | 1 | 0 | 2 | 2 |
| HARQ process number | 0 | 0 | 4 | 4 |
| A-CSI request | 0 | 0 | 2 | 2 |
| DMRS TDM Pattern | 2 | 0 | 2 | 2 |
| 2nd-stage SCI T/F location | 0 | 2 | 0 | 0 |
| Reserved Bits (or TBD) | 6 | 2 | 6 | 10 |

TABLE 1-continued

| | 2-stage SCI | | | |
|---|---|---|---|---|
| | 1 st-stage SCI | | 2nd-stage SCI for | Single SCI |
| Parameters | Broadcast | Unicast/ groupcast | unicast/group cast | |
| CRC | 24 | 24 | 24 | 24 |
| sub-total (bits) | 61~62 | 61~62 | 46 | 103 |
| Total (bits) | 61~62 | 107~108 | | 103 |

In Table 1, "Format indicator" can be 1 or more bits information to indicate whether it is 1st-stage SCI for scheduling broadcast message and/or 1st-stage SCI used at least for sensing purpose. If it is used to schedule broadcast transmission, then there is no need of 2nd-stage SCI to be followed. If it is used for sensing purpose (e.g., for unicast/groupcast), the 2nd-stage SCI will be followed to carry the remaining information such as scheduling information for unicast/groupcast message reception. Moreover, 1st-stage SCI can also be used to carry the sensing information for the grant-free transmission (RRC-based grant-free transmission similar to type 1 grant-free transmission in Uu interface or SCI-based grant-free transmission similar to semi-persistent scheduling (SPS) transmission or type 2 grant-free transmission in Uu interference). In this case, the 2nd-stage SCI may not be needed since the detailed scheduling information has been carried in the configuration message by the setup or (pre-)configuration. For example, such 1st-stage SCI for sensing purpose of the grant-free transmission can be transmitted periodically based on (pre-)configuration or transmitted based on sensing results along with each data transmission. It can be transmitted together with data or earlier than the data transmission for the sensing purpose.

In addition, the format indicator can further indicate whether there is only 1st-stage SCI transmission for sensing purpose without any 2nd-stage SCI for scheduling information and scheduling information for Data. For example, for grant-free transmission, the target UE has already known the scheduling information for data based on (pre-)configuration or UE-UE signaling. Then the 1st-stage SCI is just for sensing purpose to be decoded by the other UEs but not by the intended UE. In this case, there is no need of 2nd-stage SCI and also at least no need of MCS information in the 1st-stage SCI.

"Source/Dest UE/group ID(s)" can be a field of 8/16/24 bits. For broadcast message or communication, there may be no need of source/Dest UE/group ID. Meanwhile, the synchronous HARQ is applied for broadcast transmission by indicating the retransmission time via the field "Time gap between initial transmission and retransmission". For unicast/groupcast, "Time gap between initial transmission and retransmission" may not be needed because of asynchronous HARQ.

Dest UE/group ID can be included in the 1 st-stageSCI to indicate the intended UE(s) for 2nd-stage SCI and data reception so that the unintended UE(s) do not need to receive the 2nd-stage SCI and the associated data. Meanwhile, the Dest UE/group ID can be used for the DMRS sequence generation, e.g., the initial value for sequence generation can be a function of the Dest UE/group ID. In case of grant-free transmission, the source/dest UE/group ID may not be included in 1 st-stage SCI (maybe no need of 2nd-stage SCI in this case) because it is just for sensing purpose to be decoded by the other UEs. The scheduling information for grant-free transmission (at least the first transmission) has been (pre-)configured with no need of SCI transmission. Alternatively, the dest ID can be included in 1 st-stage SCI for sensing of the grant-free transmission, which provides the potential for proactive interference cancellation by reusing the same time/frequency resources for the other UEs as the dest UE to exploit the spatial reuse gain via IC.

"Priority" is used to indicate the priority of the transmission to be used for sensing and resource selection, similar to the usage in LTE V2X.

"Resource reservation" is used to indicate/derive time resources to be used for the upcoming transmission(s).

"Frequency resource location" can be used to indicate the frequency domain resource allocation for the data (including 2nd-stage SCI) transmission or the frequency shift to the lowest index of the physical resource blocks (or sub-channel) for the last data transmission.

"Time gap between initial transmission and retransmission" can be used to derive the occasions of the retransmission or the corresponding initial transmission. In case of asynchronous HARQ for unicast/groupcast, it may not be needed.

"Retransmission index" is used to indicate the first transmission or retransmission.

"Modulation and coding scheme" may be used to indicate the MCS level of the broadcast communication. In case of unicast/groupcast with 2-stage SCI transmission, the exact MCS information can be carried in the 2nd-stage SCI. Alternatively or additionally, one or a few modulation levels (such as QPSK, 16QAM, 64QAM, 256QAM) can be indicated in the 1st-stage SCI for deriving the target SINR level for data transmission and the potential resource size of the 2nd-stage SCI.

"Transmission format" can be used to indicate whether transport block (TB) scaling is applied or which MCS table is used (Table with up to 64QAM or Table with up to 256QAM) associated with the interpretation of the MCS field.

"New data indicator" indicates whether it is a new transmission or retransmission.

"Redundancy version" indicates the RV version of the transmission.

"HARQ process number" indicates the number of HARQ process to be used for HARQ combining.

"A-CSI request" requests the UE to measure and report a periodical channel state indicator (CSI). The CSI to be measured can be the DMRS of the 1st-stage SCI, 2nd-stage SCI and/or Data DMRS which are occurred at the same slot of the corresponding SCI transmission.

"DMRS TDM Pattern" indicates the number and the locations of the Data DMRS in time domain. The starting symbol for data DMRS can be indicated by another filed or (pre-)configured by the network, SL connection setup message, or UE. For example, the starting symbol for data DMRS is always in the first symbol of the slot or the first symbol for SL transmission in a slot, or the first symbol for SL Data transmission or the first symbol just after the 1st-stage SCI transmission.

"2nd-stage SCI T/F location" indicates the time/frequency locations of the 2nd-stage SCI.

"Reserved Bits" may be for the future usage or to be decided (TBD) later.

"CRC" field is used to carry CRC bits. It can be further scrambled by UE/group ID (dest and/or source UE/group ID). CRC bits can be 8, 16, or 24 bits. I n case of 24 bits of CRC and 24 bits ID, all 24 bits can be scrambled in the CRC of the 2nd-stage SCI. Alternatively, only (the most or the least) 16 bits of ID can be scrambled in the end of 16 bits CRC of the 24 bits CRC. The remaining 8 bits of ID can be explicitly carried in the payload of 2nd-stage SCI. The similar approach can be applied for the case with 16 bits CRC and 16 bits of UE ID.

Additionally, the following information can be carried: (1) The port number information and the ports. (2) The field for the different size of the 2nd-stage SCI. For example, 2 bits can be used to indicate one of four different sizes which are pre-defined in a table. According to the different SCI size, the time/frequency location for 2nd-stage SCI as indicated by "2nd-stage SCI T/F location" can be interpreted differently. (3) The field to indicate the starting symbol of the 1st-stage SCI, 2nd-stage SCI and/or data transmission. (4) The field to indicate the lowest PRB index of the 1st-stage SCI, 2nd-stage SCI and/or data transmission.

In an embodiment, a 2nd-stage SCI time/frequency location can be derived from the information fields carried in a 1st-stage SCI. Both the 1st- and 2nd-stage SCIs can be transmitted using centralized frequency resources or distributed frequency resources. The 1st-stage SCI and 2nd-stage SCI can be time domain multiplexed in different symbols and/or frequency domain multiplexed in different RBs (interleaved or non-interleaved). The 2nd-stage SCI can share/use the time/frequency resources reserved for a respective data channel.

Figure 5:
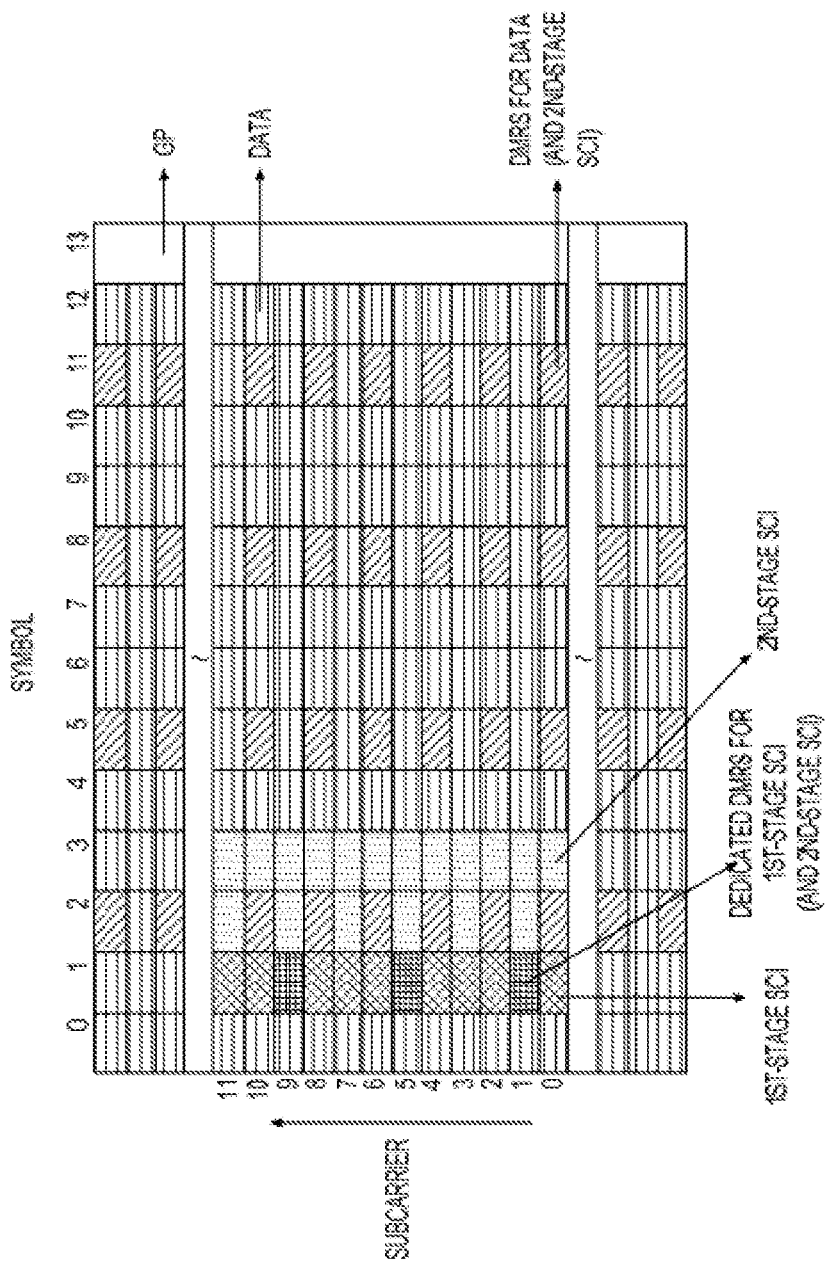
FIG. 5 shows a scenario where a 1st-stage SCI and a 2nd-stage SCI are time division multiplexed (TDMed).

FIG. 5 shows a scenario where the 1st-stage SCI and 2nd-stage SCI are TDMed. Different from what is shown in FIG. 5, in other examples, the 1st-stage SCI and 2nd-stage SCI can each be mapped to multiple symbols.

Figure 6:
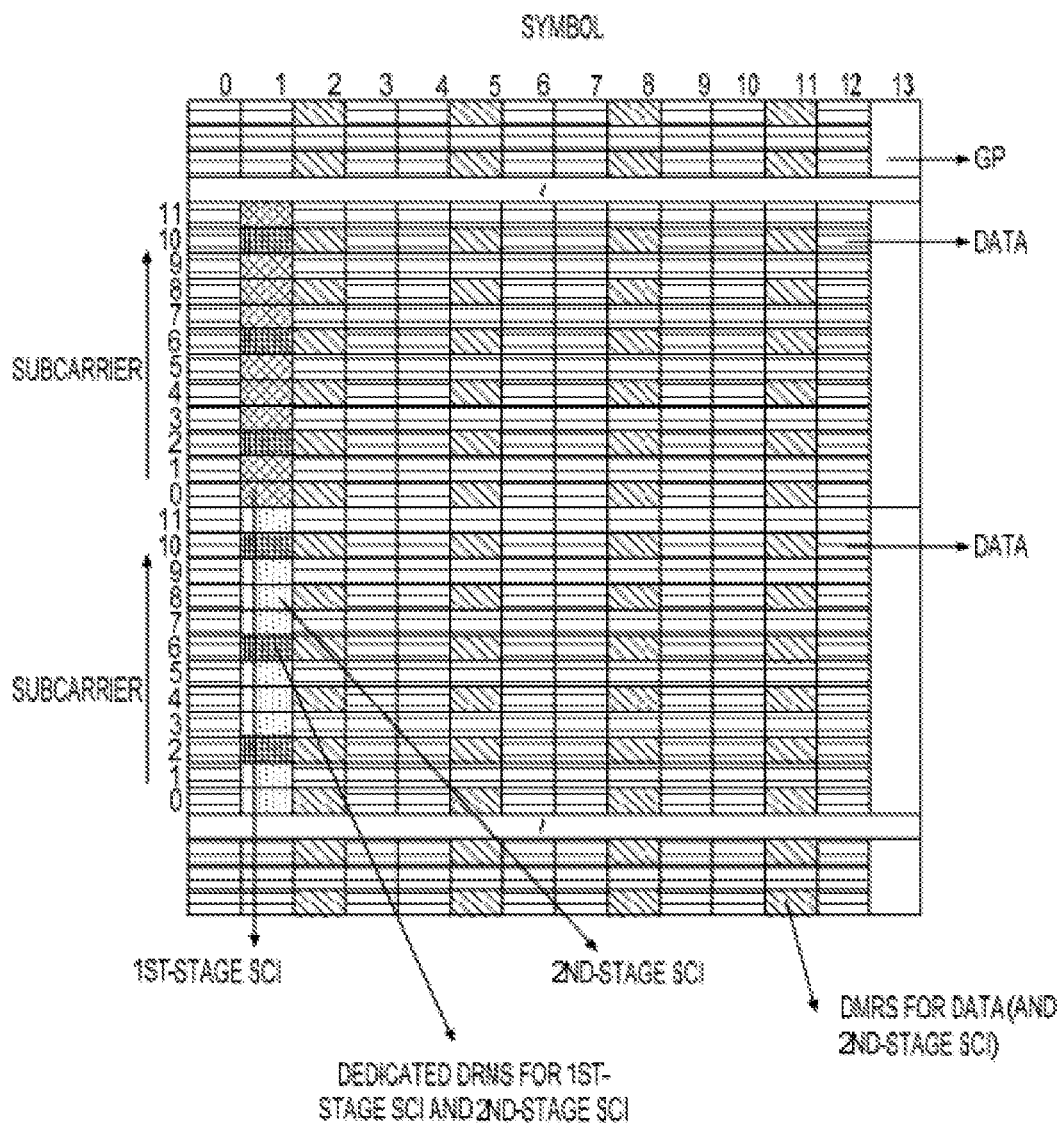
FIG. 6 shows another scenario where a 1st-stage SCI and a 2nd-stage SCI are frequency division multiplexed (FDMed).

FIG. 6 shows another scenario where the 1st-stage SCI and 2nd-stage SCI are FDMed. Similarly, in different examples, the 1st-stage SCI and 2nd-stage SCI can each be mapped to multiple symbols.

In an embodiment, the 2nd-stage SCI location can be indicated in the 1st-stage SCI explicitly using 2-4 bits. Each codepoint (or entry) can indicate one of the time/frequency locations of 2nd-stage SCI predefined in a mapping table.

In an embodiment, a 2nd-stage SCI location can be derived based on one or more fields in a 1st-stage SCI which indicate a modulation level, a subset of modulations, or MSB/LSB bits of a MCS index in a MCS table for data transmission. For example, the modulation to be used for the data can determine a target SINR level. Supposing the payload size are fixed for the 2nd-stage SCI, the resource size for 2nd-stage SCI (e.g., total number of PRBs) can be a function of the modulation level for data transmission due to the link adaption together with data transmission. For example, the resource size can be derived from the data modulation level which is linked to a target SINR/SNR level. Such target SINR/SNR level can be used to determine a coding rate. Then the resource size can be determined according to the coding rate and the payload size. Table 2 shows an example of a mapping table where different resource sizes of the 2nd-stage SCI are mapped with different modulation levels indicated in the 1st-stage SCI.

TABLE 2

| Modulation level indicated in 1st-stage SCI for Data(<=2 bits) | 2nd-stage SCI Resource Size derived from Modulation indicated in 1st-stage SCI. |
| --- | --- |
| QPSK | Resource (size) 1 (e.g., 96 RBs X 1 symbol, or 48 RBs X 2 symbols, etc) |

TABLE 2-continued

| Modulation level indicated in 1st-stage SCI for Data(<=2 bits) | 2nd-stage SCI Resource Size derived from Modulation indicated in 1st-stage SCI. |
| --- | --- |
| 16QAM | Resource (size) 2 (e.g., 48 RBs X 1 symbol, or 24 RBs X 2 symbols, etc) |
| 64QAM | Resource (size) 3 (e.g., 24 RBs X 1 symbol, or 12 RBs X 2 symbols, etc) |
| 256QAM | Resource (size) 4 (e.g., 12 RBs, 1 symbol, or 6 RBs X 2 symbols, etc) |

In addition, the corresponding time/frequency locations of each resource or resource size (e.g., the number of symbols in time domain and the number of PRBs in frequency domain) can be derived based on pre-defined rules or (pre-)configurations, e.g., the (pre-)configuration of the starting symbol and/or the lowest index of the PRBs for 2nd-stage SCI or the (pre-)configuration relative/fixed offset in time/frequency domain to the data resource allocation.

In case of multiple combinations of time and frequency resources, it can be determined based on data resource configuration. For example, the bandwidth for 2nd-stage SCI is selected from a set of values with the one close to the data or sub-channel bandwidth. For example, with a set of values {12, 24, 48, 96} RBs for 2nd-stage SCI bandwidth and the data transmission bandwidth is indicated as 50 RBs, the 2nd-stage SCI bandwidth will be selected as 48 RBs, i.e., close but smaller than data bandwidth. Furthermore, a PRB_Offset can be applied as the restriction, e.g., close but smaller than Data BW_PRB−PRB_Offset. Such PRB_Offset can be used to leave PRB_Offset/2 PRBs in each edge of the bandwidth and protect 2nd-stage SCI from in-band emission interference. Such PRB_Offset can be (pre-)configured by base station or UEs. Further based on the selected bandwidth and the total number of resource size, the number of symbols in time domain can be determined accordingly as such:

Number of symbols=floor (the total number of RBs/Number of RBs per symbol) or ceiling (the total number of RBs/Number of RBs per symbol).

Table 3 and Table 4 together show an example where MCS for data transmission can be determined based on a combination of fields in a 1st-stage SCI and a corresponding 2nd-stage SCI.

TABLE 3

| Modulation indicated in 1st-stage SCI (<=2 bits) | Index for MCS under each modulation scheme in 1st- or 2nd-stage SCI. |
| --- | --- |
| QPSK | Code points from 0000 to 1111 represent QPSK_0-QPSK_15 with corresponding index in the MCS table as shown in Table 4 (e.g., MCS_0-MCS_7 with QPSK, the remaining code point QPSK_8-QPSK_15 may be reserved if there is no corresponding QPSK MCS in the MCS table.) |
| 16QAM | Code points from 0000 to 1111 represent 16QAM_0-16QAM_15 with corresponding index in the MCS table as shown in Table 4 (e.g., MCS_8-MCS_15 with 16QAM, the remaining code point 16QAM_8-16QAM_15 may be reserved if there is no corresponding 16QAM MCS in the MCS table.) |

TABLE 3-continued

| Modulation indicated in 1st-stage SCI (<=2 bits) | Index for MCS under each modulation scheme in 1st- or 2nd-stage SCI. |
|---|---|
| 64QAM | Code points from 0000 to 1111 represent 64QAM_0-64QAM_15 with corresponding index in the MCS table as shown in Table 4 (e.g., MCS_16-MCS_23 with 64QAM, the remaining code points 64QAM_8-16QAM_15 may be reserved if there is no corresponding 64QAM MCS in the MCS table.) |
| 256QAM | Code points from 0000 to 1111 represent 256QAM_0-256QAM_15 with corresponding index in the MCS table as shown in Table 4 (e.g., MCS_24-MCS_28 with 64QAM, the remaining code points 256QAM_5-256QAM_15 may be reserved if there is no corresponding 256QAM MCS in the MCS table.) |

Table 4 shows an example of am, transport block size (TBS) index and redundancy version table for SL data channel.

TABLE 4

| MCS Index $I_{MCS}$ | Modulation Order $Q_m$ | TBS Index $I_{TBS}$ | Redundancy Version $rv_{idx}$ |
|---|---|---|---|
| 0 | 2 | 0 | 0 |
| 1 | 2 | 2 | 0 |
| 2 | 2 | 4 | 0 |
| 3 | 2 | 6 | 0 |
| 4 | 2 | 8 | 0 |
| 5 | 2 | 10 | 0 |
| 6 | 4 | 11 | 0 |
| 7 | 4 | 12 | 0 |
| 8 | 4 | 13 | 0 |
| 9 | 4 | 14 | 0 |
| 10 | 4 | 16 | 0 |
| 11 | 4 | 17 | 0 |
| 12 | 4 | 18 | 0 |
| 13 | 4 | 19 | 0 |
| 14 | 6 | 20 | 0 |
| 15 | 6 | 21 | 0 |
| 16 | 6 | 22 | 0 |
| 17 | 6 | 23 | 0 |
| 18 | 6 | 24 | 0 |
| 19 | 6 | 25 | 0 |
| 20 | 6 | 27 | 0 |
| 21 | 6 | 28 | 0 |
| 22 | 6 | 29 | 0 |
| 23 | 8 | 30 | 0 |
| 24 | 8 | 31 | 0 |
| 25 | 8 | 32 | 0 |
| 26 | 8 | 32A | 0 |
| 27 | 8 | 33 | 0 |
| 28 | 8 | 34 | 0 |
| 29 | reserved | | 1 |
| 30 | | | 2 |
| 31 | | | 3 |

In an embodiment, a new MCS table can be constructed by using a combination of the fields in 1st-stage SCI and 2nd-stage SCI to derive a final data MCS. Such solution can reduce the signaling overhead by indicating the resource (size) for 2nd-stage SCI and part of MCS information for data transmission simultaneously. Table 5 shows an example of a modulation, TBS index and redundancy version table for SL data channel based on a combination of fields in 1st-stage SCI and 2nd-stage SCI.

TABLE 5

| Modulation Order indicated in 1st-stage SCI $Q_m$ | MCS Index in 2nd-stage SCI $I_{MCS}$ | Final MCS Index based on combinations $I_{MCS}$ | TBS Index $I_{TBS}$ | Redundancy Version $rv_{idx}$ |
|---|---|---|---|---|
| 2 (QPSK) (or MCS index range 0~5) | 0 | 0 | 0 | 0 |
| | 1 | 1 | 2 | 0 |
| | 2 | 2 | 4 | 0 |
| | 3 | 3 | 6 | 0 |
| | 4 | 4 | 8 | 0 |
| | 5 | 5 | 10 | 0 |
| 4 (16QAM) (or MCS index range 6~13) | 0 | 6 | 11 | 0 |
| | 1 | 7 | 12 | 0 |
| | 2 | 8 | 13 | 0 |
| | 3 | 9 | 14 | 0 |
| | 4 | 10 | 16 | 0 |
| | 5 | 11 | 17 | 0 |
| | 6 | 12 | 18 | 0 |
| | 7 | 13 | 19 | 0 |
| 6 (64QAM) (or MCS index range 14~22) | 0 | 14 | 20 | 0 |
| | 1 | 15 | 21 | 0 |
| | 2 | 16 | 22 | 0 |
| | 3 | 17 | 23 | 0 |
| | 4 | 18 | 24 | 0 |
| | 5 | 19 | 25 | 0 |
| | 6 | 20 | 27 | 0 |
| | 7 | 21 | 28 | 0 |
| | 8 | 22 | 29 | 0 |
| 8 (256QAM) (or MCS index range 23~28) | 0 | 23 | 30 | 0 |
| | 1 | 24 | 31 | 0 |
| | 2 | 25 | 32 | 0 |
| | 3 | 26 | 32A | 0 |
| | 4 | 27 | 33 | 0 |
| | 5 | 28 | 34 | 0 |
| reserved | | 29 | 29 | 1 |
| | | 30 | 30 | 2 |
| | | 31 | 31 | 3 |

Similarly, a resource (size) for 2nd-stage SCI can be derived if the MCS index range is used instead of modulation level. Table 6 shows an example table indicating mapping between a MCS index range and a resource (size) of a 2nd-stage SCI.

TABLE 6

| Index | MCS index range in the MCS table for the data | 2nd-stage SCI Resource Size derived from Modulation indicated in 1st-stage SCI. |
|---|---|---|
| 0 | MCS_0-MCS_7 | Resource (size) 1 (e.g., 96 RBs X 1 symbol, or 48 RBs X 2 symbols, etc) |
| 1 | MCS_8-MCS_15 | Resource (size) 2 (e.g., 48 RBs X 1 symbol, or 24 RBs X 2 symbols, etc) |
| 2 | MCS_16-MCS_23 | Resource (size) 3 (e.g., 24 RBs X 1 symbol, or 12 RBs X 2 symbols, etc) |
| 3 | MCS_24-MCS_31 | Resource (size) 4 (e.g., 12 RBs, 1 symbol, or 6 RBs X 2 symbols, etc) |

In some embodiments, multi-antenna transmission is employed. Accordingly, antenna port information (the number of antenna ports and/or the indices of antenna ports) can be carried in a 1st-stage SCI. In case of the different layers (or different number of antenna ports) for (2nd-stage SCI) transmission, the corresponding resource (size) can be different. So the number of antenna ports can be further used to determine the 2nd-stage SCI resources. For example, the 2nd-stage SCI resource (size) is a function of number of antenna ports. More layers, the smaller size per layer for 2nd-stage SCI due to multiple layer transmissions.

In an embodiment, the 2nd-stage SCI can have the link adaptation associated with the data channel link adaptation.

2nd-stage SCI can have the same transmission scheme as the data channel with the same antenna port(s) or the different transmission scheme with different antenna port(s) but with the same power per resource element. If the 1st-stage SCI can have the link adaption with several resource (sizes) or aggregation levels as NR/LTE control channels, the 2nd-stage SCI resource (size) can also be implicitly indicated or derived based on the detection of the 1st-stage SCI resources. For example, the 2nd-stage SCI resource (size) is a function of the detected 1st-stage SCI resource size or based on a pre-defined table with a mapping between 2nd-stage SCI resource (size) and the detect 1st-stage SCI resource (size).

In an embodiment, for 1st/2nd-stage SCI or single SCI resource allocation, both localized and distributed resource allocation can be supported. A total number of PRBs (or RBs) for sidelink control channel can be calculated as below:

Total_SCI_RBs=Total_Control_REs/available_Ctrl-REinOneRB=(Payload+CRCbits)/targetCodingRate/(REs_inOneRB-DMRSorOtherREs_inOneRB), where targetCodingRate can be determined by the target SNR level which can be derived from the field in 1st-stage SCI (e.g., data modulation level or MCS range) for control channel with link adaption. For the control channel without link adaption, the coding rate can be fixed or (pre-)configured.

In an embodiment, the resource elements are mapping firstly in the frequency domain and then time domain based on the principle that the same number of PRBs are in each symbol. Further, the number of RBs in each symbol is same or smaller than the data/sub-channel/BWP bandwidth. There can be a PRB_offset in the edge of data or sub-channel for derive the starting PRB of the control channel.

Figure 7:
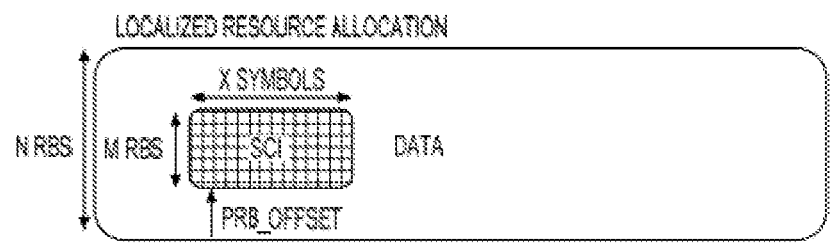
FIG. 7 shows an example of localized resource allocation according to an embodiment of the disclosure.

FIG. 7 shows an example of localized resource allocation according to an embodiment of the disclosure. As shown, a number of symbols, X, can be determined by satisfying the condition with a minimum X value:

Ceiling(total_SCI_RBs/$X$_symbols)<=$N$_RBs-PRB_Offset, or

Ceiling(total_SCI_RBs/$X$_symbols)<=$N$_RBs-2×PRB_Offset, where N_RBs is the total bandwidth of data or sub-channel or BWP, and PRB_Offset is the gap or margin relative to the (both) edge of the data or sub-channel. The starting PRB index for control channel within the data or sub-channel region can be PRB_Offset relative to the lowest index of the data or sub-channel RBs.

Alternatively, the control channel can be located in the center of data or sub-channel region, e.g., the RBs for control channel is determined as a range:

{LowestRBIndex, HighestRBIndex}={referencePoint+ceiling($N$_RBs/2-$L$_RBs/2),referencePoint+ceiling($N$_RBs/2+$L$_RBs/2), where L_RBs is the number of RBs in one symbol for the control channel as derived previously, and referencePoint can be zero or (pre-)configured, e.g., the edge of (allocated/scheduled) data, sub-channel or bandwidth part, which is used to derive the absolute RB index.

Figure 8:
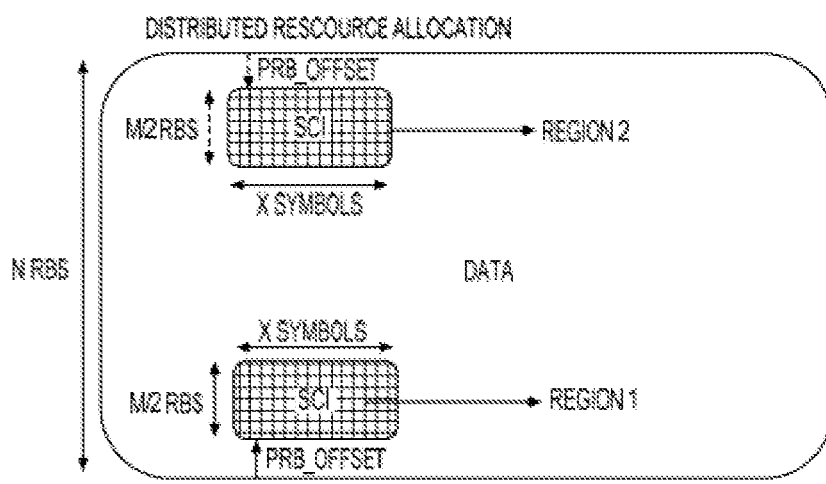
FIG. 8 shows an example of distributed resource allocation according to an embodiment of the disclosure.

FIG. 8 shows an example of distributed resource allocation according to an embodiment of the disclosure. Symbols for control channel can be determined in a way similar to the localized resource allocation in FIG. 7. Different from the FIG. 7 example, the RE mapping can start from the both edge of the data/sub-channel/BWP region with a RB index range determined as below:

{LowestRBIndex,HighestRBIndex} for region 1 (i.e., lower part of the region in FIG. 4)={referencePoint+PRB_Offset, referencePoint+PRB_Offset+ceiling($L$_RBs/2)},and {LowestRBIndex,HighestRBIndex} for region 1 (i.e., lower part of the region in FIG. 4)={referencePoint+$M$_RBs-PRB_Offset-ceiling($L$_RBs/2), referencePoint+$M$_RBs-PRB_Offset}.

In an embodiment, power boosting can be applied between the sidelink control channel and data channel. The power offset can be indicated during the sidelink RRC connection setup for unicast/groupcast communication or indicated in the 1st-stage SCI.

In an embodiment, a DMRS location in frequency domain for the 1st-stage SCI can be fixed. In an embodiment, 1st- and/or 2nd-stage SCI can reuse/share the data channel (PSSCH) DMRS wholly or partly with no need of the dedicated DMRS for 2nd-stage SCI to reduce the overhead. The dest (or source) UE/group ID can be used for sequence generation of the data channel (and 2nd-stage SCI) DMRS, e.g., the initial value for sequence generation can be a function of the Dest UE/group ID. Alternatively, the reference signal for 1st and/or 2nd-stage SCI can have the own dedicated DMRS other than sharing data DMRS. It is possible to perform the channel estimation for 1st and/or 2nd-stage SCI based on the dedicated DMRS independently or jointly with data DMRS if the antenna port and/or transmission scheme is same for data and control channel.

In an embodiment, a field in the 1st and/or 2nd-stage SCI can indicate whether the 1st-stage SCI DMRS and the 2nd-stage SCI/Data are QCLed (e.g., Type-A and/or Type-D QCl'ed relation as defined in 3GPP TS38.213). If they are QCL'ed, both DMRSs can be used jointly for channel estimation to improve the performance. Or UE may assume QCLed transmission between 1st-stage SCI and 2nd-stage SCI, e.g., QCL'ed transmission between the DMRS of 1st-stage SCI and the DMRS of 2nd-stage SCI so that the joint channel estimation can be applied.

In an embodiment, channel coding of the 2nd-stage SCI can use polar code. A shorter CRC (e.g, 16 bits CRC) can be applied for the 2nd-stage SCI (and/or 1st-stage SCI) to reduce CRC overhead.

Figure 9:
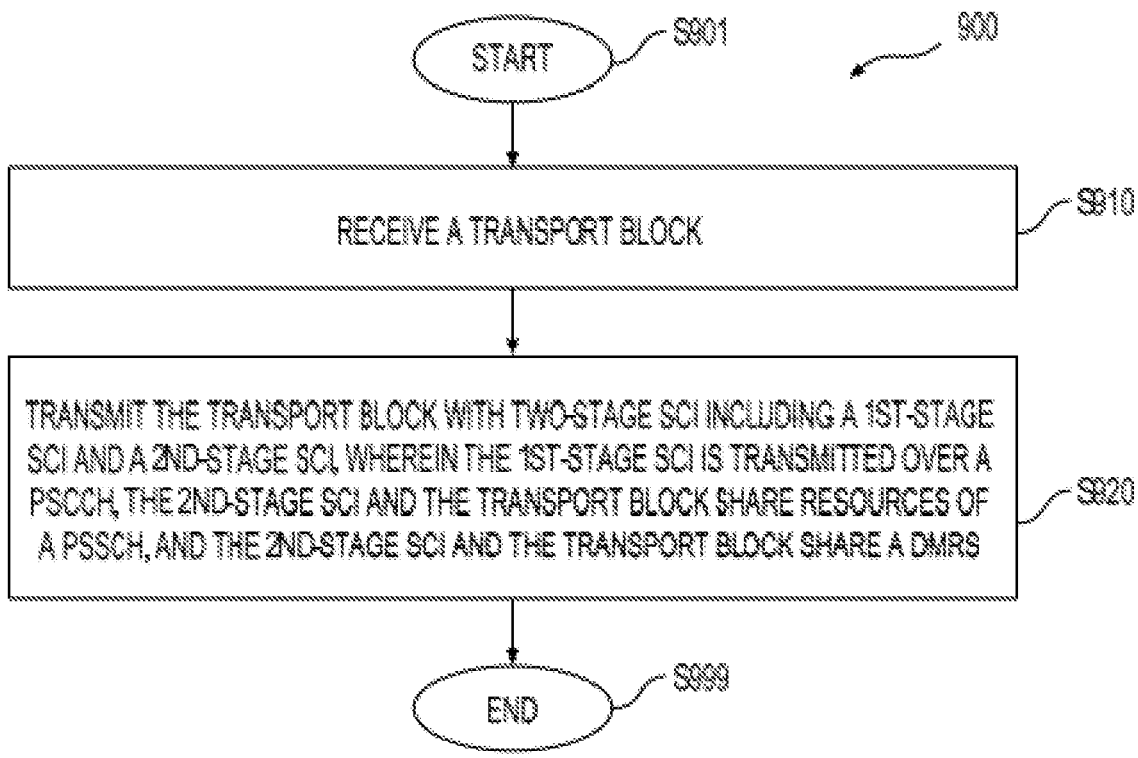
FIG. 9 shows a process 900 of sidelink transmission with two-stage SCI according to an embodiment of the disclosure.

FIG. 9 shows an example process 900 of sidelink transmission with two-stage SCI according to an embodiment of the disclosure. The process 900 can start from S901, and proceed to S910.

At S910, a transport block can be received at a physical layer of a Tx UE. For example, the transport block is generated at a transport layer in a protocol stack and carried in a transport channel (referred to as sidelink shared channel (SL-SCH)).

At S920, the transport block can be processed at the physical layer and transmitted from the Tx UE to a Rx UE. A two-stage SCI including a 1st-stage SCI and a 2nd-stage SCI can be used for the transmission. The 1st-stage SCI can be transmitted over a PSCCH. The 2nd-stage SCI and the transport block can share radio resources assigned for a PSSCH. The 2nd-stage SCI and the transport block can share a DMRS. No dedicated DMRS is transmitted for the 2nd-stage SCI. The process 900 proceeds to S999, and terminates at S999.

Figure 10:
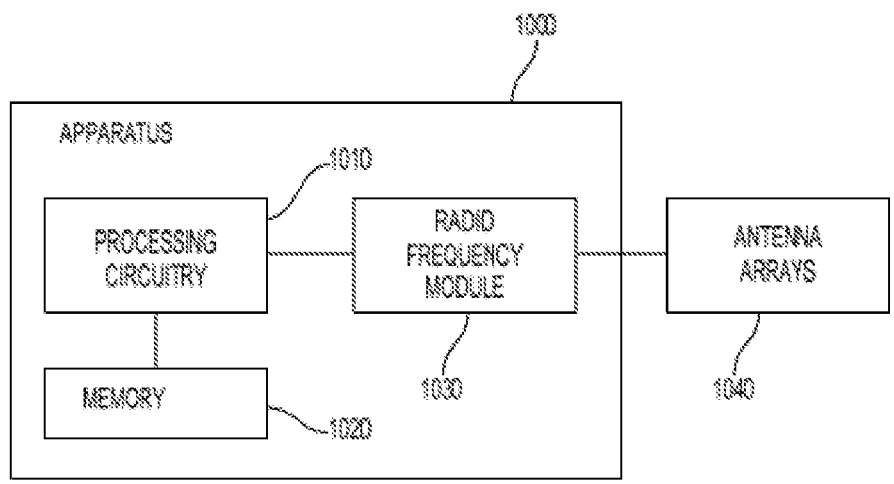
FIG. 10 shows an exemplary apparatus 1000 according to embodiments of the disclosure.

FIG. 10 shows an exemplary apparatus 1000 according to embodiments of the disclosure. The apparatus 1000 can be configured to perform various functions in accordance with one or more embodiments or examples described herein. Thus, the apparatus 1000 can provide means for implementation of mechanisms, techniques, processes, functions, components, systems described herein. For example, the apparatus 1000 can be used to implement functions of UEs or BSs in various embodiments and examples described herein. The apparatus 1000 can include a general purpose processor or specially designed circuits to implement various functions, components, or processes described herein in various embodiments. The apparatus 1000 can include processing circuitry 1010, a memory 1020, and a radio frequency (RF) module 1030.

In various examples, the processing circuitry 1010 can include circuitry configured to perform the functions and processes described herein in combination with software or without software. In various examples, the processing circuitry 1010 can be a digital signal processor (DSP), an application specific integrated circuit (ASIC), programmable logic devices (PLDs), field programmable gate arrays (FPGAs), digitally enhanced circuits, or comparable device or a combination thereof.

In some other examples, the processing circuitry 1010 can be a central processing unit (CPU) configured to execute program instructions to perform various functions and processes described herein. Accordingly, the memory 1020 can be configured to store program instructions. The processing circuitry 1010, when executing the program instructions, can perform the functions and processes. The memory 1020 can further store other programs or data, such as operating systems, application programs, and the like. The memory 1020 can include non-transitory storage media, such as a read only memory (ROM), a random access memory (RAM), a flash memory, a solid state memory, a hard disk drive, an optical disk drive, and the like.

In an embodiment, the RF module 1030 receives a processed data signal from the processing circuitry 1010 and converts the data signal to beamforming wireless signals that are then transmitted via antenna arrays 1040, or vice versa. The RF module 1030 can include a digital to analog converter (DAC), an analog to digital converter (ADC), a frequency up converter, a frequency down converter, filters and amplifiers for reception and transmission operations. The RF module 1030 can include multi-antenna circuitry for beamforming operations. For example, the multi-antenna circuitry can include an uplink spatial filter circuit, and a downlink spatial filter circuit for shifting analog signal phases or scaling analog signal amplitudes. The antenna arrays 1040 can include one or more antenna arrays.

The apparatus 1000 can optionally include other components, such as input and output devices, additional or signal processing circuitry, and the like. Accordingly, the apparatus 1000 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

The invention claimed is:

1. A method, comprising:
   receiving a transport block; and
   transmitting from a transmission user equipment (Tx UE) to a reception user equipment (Rx UE) the transport block with two-stage sidelink control information (SCI) including a 1st-stage SCI and a 2nd-stage SCI, wherein
   the 1st-stage SCI is transmitted over a physical sidelink control channel (PSCCH), wherein the 1st-stage SCI includes information of antenna port(s) used for transmission of the PSSCH,
   the 2nd-stage SCI and the transport block share resources of a physical sidelink shared channel (PSSCH), and
   the 2nd-stage SCI and the transport block share a demodulation reference signal (DMRS).

2. The method of claim 1, wherein the transmitting from the Tx UE to the Rx UE the transport block with two-stage SCI includes:
   transmitting the 2nd-stage SCI and the transport block using a same transmission scheme with same one or more antenna ports.

3. The method of claim 1, wherein the transmitting from the Tx UE to the Rx UE the transport block with two-stage SCI includes:
   applying polar coding to the 2nd-stage SCI.

4. The method of claim 1, wherein the 1st-stage SCI includes fields for determining a time-frequency location of the 2nd-stage SCI.

5. The method of claim 1, further comprising:
   performing resource element (RE) mapping of the 2nd-stage SCI over resources of the PSSCH first in frequency domain and then in time domain.

6. The method of claim 1, wherein the 1st-stage SCI indicates a modulation and coding scheme (MCS) for transmission of the transport block.

7. The method of claim 6, further comprising:
determining a resource size of the 2nd-stage SCI based on the indicated MCS for transmission of the transport block.

8. The method of claim 1, wherein the 1st-stage SCI and the 2nd-stage SCI are multiplexed in different symbols in time domain or in different physical resource blocks in frequency domain.

9. The method of claim 1, wherein the 1st-stage SCI includes a field indicating whether a DMRS for the 1st-stage SCI is quasi-co-located (QCLed) with the 2nd-stage SCI and the transport block transmitted over the PSSCH.

10. An apparatus, comprising circuitry configured to:
receive a transport block; and
transmit from a transmission user equipment (Tx UE) to a reception user equipment (Rx UE) the transport block with two-stage sidelink control information (SCI) including a 1st-stage SCI and a 2nd-stage SCI, wherein
the 1st-stage SCI is transmitted over a physical sidelink control channel (PSCCH), wherein the 1st-stage SCI includes information of antenna port(s) used for transmission of the PSSCH,
the 2nd-stage SCI and the transport block share resources of a physical sidelink shared channel (PSSCH), and
the 2nd-stage SCI and the transport block share a demodulation reference signal (DMRS).

11. The apparatus of claim 10, wherein the circuitry is further configured to:
transmit the 2nd-stage SCI and the transport block using a same transmission scheme with same one or more antenna ports.

12. The apparatus of claim 10, wherein the circuitry is further configured to:
applying polar coding to the 2nd-stage SCI.

13. The apparatus of claim 10, wherein the 1st-stage SCI includes fields for determining a time-frequency location of the 2nd-stage SCI.

14. The apparatus of claim 10, wherein the circuitry is further configured to:
perform resource element (RE) mapping of the 2nd-stage SCI over resources of the PSSCH first in frequency domain and then in time domain.

15. The apparatus of claim 10, wherein the 1st-stage SCI indicates a modulation and coding scheme (MCS) for transmission of the transport block.

16. The apparatus of claim 15, wherein the circuitry is further configured to:
determine a resource size of the 2nd-stage SCI based on the indicated MCS for transmission of the transport block.

17. The apparatus of claim 10, wherein the 1st-stage SCI and the 2nd-stage SCI are multiplexed in different symbols in time domain or in different physical resource blocks in frequency domain.

18. The apparatus of claim 10, wherein the 1st-stage SCI includes a field indicating whether a DMRS for the 1st-stage SCI is quasi-co-located (QCLed) with the 2nd-stage SCI and the transport block transmitted over the PSSCH.

19. A non-transitory computer-readable medium storing instructions that, when executed by a processor, causing the processor to perform a method, the method comprising:
receiving a transport block; and
transmitting from a transmission user equipment (Tx UE) to a reception user equipment (Rx UE) the transport block with two-stage sidelink control information (SCI) including a 1st-stage SCI and a 2nd-stage SCI, wherein
the 1st-stage SCI is transmitted over a physical sidelink control channel (PSCCH), wherein the 1st-stage SCI includes information of antenna port(s) used for transmission of the PSSCH,
the 2nd-stage SCI and the transport block share resources of a physical sidelink shared channel (PSSCH), and
the 2nd-stage SCI and the transport block share a demodulation reference signal (DMRS).

* * * * *